United States Patent Office 2,952,615
Patented Sept. 13, 1960

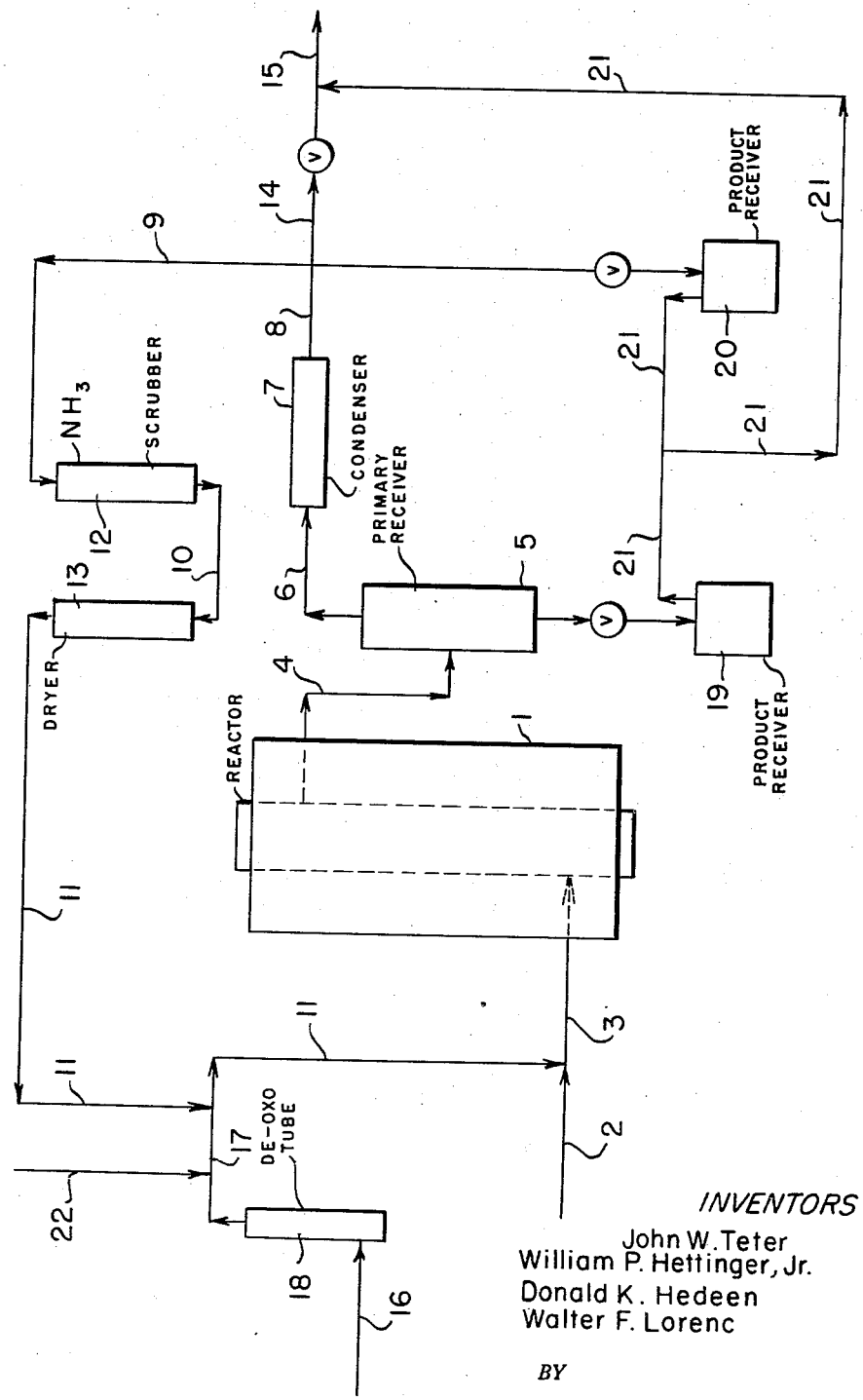

2,952,615
PROCESS FOR DEASPHALTING A PETROLEUM FEED OIL FOR USE IN A HYDROCRACKING ZONE

John W. Teter, Chicago, William P. Hettinger, Jr., Dolton, Donald K. Hedeen, Markham, and Walter F. Lorenc, Harvey, Ill., assignors to Sinclair Refining Company, New York, N.Y., a corporation of Maine Filed Aug. 5, 1955, Ser. No. 531,508

1 Claim. (Cl. 208—86)

This invention relates to an improved method for the manufacture of gasoline, diesel fuels, gas oils and the like from petroleum residues such as topped crude, reduced crude and so forth.

It has heretofore been proposed to produce gasoline and other lighter petroleum products by hydrocracking petroleum residues. This has been accomplished by hydrogenating the residue in the presence of a suitable catalyst under conditions of temperature and pressure which result in cracking as well as hydrogenation. When this is done, however, the catalyst employed rapidly becomes inactive due to the deposition thereon of carbonaceous material. The catalyst must then be regenerated to restore it to its original or active condition, and this generally necessitates an interruption of the operation so that product quality is not uniform. At the same time, the amount of hydrogen consumed in the hydrogenation is relatively high.

In accordance with the present invention, a new method for the processing of petroleum residues has been devised. This method involves separating the petroleum residue, generally one having an initial boiling point above about 650° F., into two fractions. The first fraction comprises about 75 to 95 percent by weight of the material therein soluble in n-pentane according to ASTM test D893-52T and having a content of materials insoluble in n-pentane not exceeding about 2 percent by weight by the same test. The second fraction comprises the remainder of the residue. The first fraction is then hydrocracked while it is in contact with hydrogen and a hydrocracking catalyst under hydrocracking conditions of temperature and pressure.

When the method is practiced in this manner, not only does the catalyst require considerably less frequent regeneration, but at the same time the hydrogen consumption is relatively low, yet a very large fraction of the petroleum residue can be hydrocracked in order to produce the relatively more valuable lower boiling materials such as gasoline.

The following example sets forth various embodiments which fall within the scope of the present invention:

EXAMPLE

East Chicago Velma asphalt produced as bottoms in the vacuum distillation of crude oil (22% based on crude) was extracted with a butane-pentane blend containing about 40 percent by volume of pentane, the operation being conducted by pumping the asphalt into an upper portion of an extraction tower and the butane-pentane blend into a lower portion thereof. Treated asphalt was removed from the bottom of the tower and a mixture of deasphalted oil and butane-pentane blend from the top. This mixture was then stabilized by distilling off the butane-pentane blend. The extraction was carried out under the following approximate operating conditions: top tower temperature, 230° F.; bottom tower temperature, 190° F.; tower pressure, 400 p.s.i.g.; and butane-pentane blend to feed asphalt ratio by volume, 5:1. The characteristics of the asphalt feed and the stabilized deasphalted oil produced in the operation are set forth in Table I below. The deasphalted oil contained about 1.2 weight percent of pentane insolubles.

Table I

|  | Asphalt | Deasphalted Oil, 82 weight Percent Yield on Asphalt |
|---|---|---|
| °API | | 13.2 |
| Mo. Wt. | 990–995 | 893 |
| Percent C | | 86.13 |
| Percent H | 10.34 | 10.93 |
| Percent N | | 0.60 |
| Percent S | 2.23–2.23 | 2.05 |
| Percent O | | 0.32 |
| Conradson Carbon | 16.21–16.41 | 12.03 |
| Ash | | 0.02 |
| Viscosity: | | |
| FV/210° F | 605.1 | 177 |
| FV/275° F | 80.8 | |
| Insol. in Benzene | 0.22 | 0.22 |
| Insol. in naphtha | | 1.65 |
| Insol. in CCl₄ | | 0.53 |
| Insol. in CS₂ | | 0.46 |
| Penetration, 77° F | 241 | Soft |
| Ring & Ball, °F | 100 | |
| Ni (p.p.m.) | 135 | 56–65 |
| V (p.p.m.) | 183 | 73–77 |

The stabilized deasphalted oil was subjected to a hydrocracking procedure employing the equipment shown diagrammatically in the accompanying figure. The apparatus comprised a heated one inch Universal reactor 1 which contained the bed of hydrocracking catalyst. Void space above and below the catalyst bed was packed with 5 mm. solid glass beads. Glass wool plugs retained the catalyst particles in place. Lines 2 and 3 served to introduce the feed into the reactor, and from the reactor the products passed by means of line 4 to primary receiver 5. A stream of vapors passed overhead from the primary receiver by means of line 6 into water jacketed condenser 7. A portion of the gases which were not condensed in the condenser was recycled by means of lines 9, 10, 11 and 3 back into the reactor. Gases recycled by means of lines 9, 10 and 11 pass through ammonia scrubber 12 and drier 13. The remainder of the gases not condensed in the condenser was withdrawn from the system by means of lines 14 and 15 and was collected. Fresh hydrogen was introduced into the reactor by means of lines 16, 17 and 11, the hydrogen being deoxygenated by means of Deoxo tube 18. Liquid product produced in the primary receiver was collected in product receiver 19 and liquid product condensed in the condenser was collected in product receiver 20. Line 21 served as a means of collecting gases which were not condensed in the product receivers, and line 22 was employed for the purpose of introducing hydrogen sulfide at such times as the catalyst needed sulfiding.

The catalyst employed in the various tests was a commercially available cobalt oxide and molybdenum oxide on alumina catalyst which was ground to 20–60 mesh. The analysis of the unground catalyst on an ignited basis was as follows:

| | | |
|---|---|---|
| Cobalt | wt. percent | 2.62 |
| MoO₃ | do | 9.65 |
| Alumina | do | 80.89 |
| Silica | do | 5.5 |
| Carbon | do | 1.0 |
| Sodium | do | 0.079 |
| Iron | do | 0.0042 |
| Calcium and magnesium | do | 0.022 |
| Sulfate | do | 0.204 |
| Chloride | do | 0.034 |
| Arsenic | p.p.m. | 19 |

| | |
|---|---|
| Crush strength _____ pounds | 32 |
| Apparent density _____ | 1.13 |
| Particle density _____ | 1.59 |
| Nitrogen area _____ m.²/g | 256 |
| Total pore volume _____ | 0.312 |
| Volume of pores greater than 100 A _____ | 0.005 |
| Average pore radius _____ A | 24 |

In operation, the reactor was sealed in place in a bronze block furnace, a hydrogen rate of approximately 5 standard cubic feet per hour at atmospheric pressure was established through the reactor and the heat to the furnace was turned on. The temperature was brought up to about 1,000° F. and held there for one hour, after which the temperature was allowed to drop to 940–950° F. The hydrogen was turned off and hydrogen sulfide at atmospheric pressure was introduced. The exothermic reaction of converting cobalt and molybdenum oxides to the sulfides resulted in a rise in temperature to approximately 1,000° F. The temperature was then allowed to drop to approximately 30° F. below operating conditions and the system was pressured with hydrogen. Fresh hydrogen flow was then established.

Following this, feed stock was introduced at a predetermined rate into the pressurized reactor and recycling of the gas was started simultaneously. A process run of approximately two hours' duration was made in order to line out temperatures and rates and establish steady state conditions. The products which were then collected constituted the official run. The liquid products were collected in flasks with the off gases going through a series of Dry Ice-acetone traps, gas sampler and wet test meter. The wet gases condensed in the Dry Ice-acetone traps were combined with the liquid products collected in the flasks and stabilized to remove the $C_4$-material.

A sample of dry gas from the gas sampler and wet gas overhead from the stabilizer were submitted for mass spectrograph analysis. The stabilized liquid product was then submitted to fractionation for a split into $C_5$—400° F. true boiling point gasoline, 400–600° F. true boiling point gas oil, 600–950° F. cut and bottoms.

Table II sets forth the results obtained in a series of runs. In those runs, fresh hydrogen at the rate of 3,000 standard cubic feet per barrel were fed and recycle gas at the rate of 4,000 standard cubic feet per barrel were introduced into the reactor, with the exception of run No. 11. Most of the data were obtained on runs of 8 hours or less, but runs Nos. 12, 13 and 14 used the same batch of catalyst and totalled 18 hours approximately.

present invention. Thus, although in those experiments reaction temperatures of 760–875° F., pressures of 600–2400 p.s.i.g. and weight hourly space velocities of 0.34–10.2 were utilized, further variations in reaction temperature, pressure and weight hourly space velocity are permissible. Generally, however, the reaction temperature used will be within the range from about 700 to about 1,000° F. and the reaction pressure will be within the range from about 400 to about 3,000 p.s.i.g. Weight hourly space velocities within the range from about 0.2 to about 20 can be utilized, if desired. Also, although in the specific experiments the amount of hydrogen introduced into the reaction system was of the order of about 3500 or 6000 standard cubic feet per barrel, this also is not critical, as those skilled in the art will understand. Usually, the amount of hydrogen introduced into the reaction zone will be within the range from about 500 standard cubic feet to about 20,000 standard cubic feet per barrel of feed. The hydrogen consumed will depend upon the reaction conditions employed, including temperature, pressure, feed, catalyst and the like, and this can vary widely, as the specific experiments illustrate.

Any of the catalysts conventionally employed in the hydrocracking of heavy petroleum oils can be utilized in accordance with the present process. Examples of suitable catalytic ingredients are molybdenum, tungsten, vanadium, chromium, cobalt, nickel, iron and tin and their oxides and sulfides. Mixtures of these materials or compounds or two or more of the oxides can be employed. For example, mixtures or compounds of the iron group metal oxides or sulfides with the oxides or sulfides of group VI left column of the periodic table constitute very satisfactory catalysts. Examples of such mixtures or compounds are nickel molybdate, tungstate or chromate (or thiomolybdate, thiotungstate or thiochromate) or mixtures of nickel oxide with molybdenum, tungsten or chromium oxides.

These catalytic ingredients can be disposed on or carried by known cracking catalysts of the solid refractory type. Suitable catalysts of this type are silicates or mixtures of silicates or mixtures of oxides which are known to be cracking catalysts. Synthetic cracking catalysts of this type will generally be mixtures of hydrous oxides of silicon with one or more of the oxides of magnesium, boron, aluminum, titanium or zirconium. Natural cracking catalysts of this type are usually silicates of magnesium and/or aluminum combined with minor amounts of oxides of these metals which may or may not be activated as by acid treatment. Specific examples of suit-

Table II

| Run No. | 1 | 2 | 3 | 4 | 5 | 6 | 7 | 8 | 9 | 10 | ¹11 | 12 | 13 | 14 | 15 | 16 | 17 | 18 | 19 | 20 |
|---|---|---|---|---|---|---|---|---|---|---|---|---|---|---|---|---|---|---|---|---|
| Temp. °F | 800 | 800 | 875 | 760 | 760 | 810 | 875 | 875 | 810 | 810 | 810 | 760 | 760 | 760 | 810 | 810 | 810 | 760 | 810 | 760 |
| Pressure, p.s.i.g | 1500 | 1500 | 1500 | 2400 | 2400 | 2400 | 2400 | 2400 | 2400 | 2400 | 2400 | 1500 | 2400 | 2400 | 1500 | 1500 | 600 | 600 | 600 | 600 |
| WHSV | 2.0 | 2.1 | 2.0 | 0.63 | 5.1 | 1.5 | 2.0 | 5.0 | 0.79 | 10.2 | 0.80 | 0.34 | 0.35 | 0.37 | 9.9 | 0.81 | 0.81 | 0.63 | 10.1 | 5.1 |
| Products: Wt. percent on Feed (uncorrected): | | | | | | | | | | | | | | | | | | | | |
| $C_1$ | 0.5 | 0.6 | 2.2 | 0.2 | 0.1 | 0.7 | 1.7 | 1.2 | 0.5 | 0.2 | 0.6 | 0.3 | 0.4 | 0.3 | 0.3 | 0.7 | 1.0 | 0.4 | 0.3 | 0.2 |
| $C_2$ | 0.8 | 0.6 | 3.9 | 0.3 | 0.2 | 1.0 | 2.9 | 1.3 | 0.7 | 0.3 | 0.8 | 0.4 | 0.4 | 0.3 | 0.3 | 0.8 | 0.9 | 0.3 | 0.3 | 0.2 |
| $C_3$ | 1.0 | 0.9 | 4.1 | 0.3 | 0.2 | 1.1 | 2.2 | 0.8 | 0.1 | 0.7 | 0.7 | 0.7 | 0.4 | 0.4 | 0.6 | 0.8 | 1.0 | 0.3 | 0.3 | 0.3 |
| $nC_4$ | 0.4 | 0.4 | 2.5 | 0.4 | 0.5 | 0.9 | 2.6 | 1.5 | 1.2 | 0.7 | 0.2 | 0.1 | 0.1 | 0.1 | 0.1 | 0.3 | 0.2 | 0.2 | 0.1 | 0.7 |
| $iC_4$ | 0.2 | 0.3 | 0.8 | | | 0.3 | 0.8 | 0.2 | 0.2 | | | 0.4 | 0.2 | 0.2 | 0.1 | 0.3 | 0.2 | 0.1 | 0.1 | |
| $tC_4^=$ | 0.1 | 0.1 | 0.1 | | | 0.1 | 0.4 | 0.2 | 0.2 | 0.2 | | | 0.1 | 0.1 | 0.1 | 0.3 | | 0.1 | 0.1 | 0.3 |
| $C_5$–400° F | 11.1 | 9.9 | 31.7 | 8.1 | 3.1 | 15.1 | 32.5 | 24.4 | 17.2 | 3.9 | 16.4 | 8.5 | 7.6 | 6.2 | 6.3 | 15.6 | 15.6 | 9.9 | 5.4 | 1.0 |
| 400–600° F | 13.0 | 10.7 | 30.8 | 10.5 | 2.7 | 16.9 | 30.1 | 26.4 | 21.8 | 5.6 | 21.9 | 9.9 | 8.0 | 7.5 | 7.3 | 20.6 | 15.8 | 5.1 | 7.1 | 3.2 |
| 600–950° F | 30.7 | 30.2 | 20.2 | 31.8 | 16.1 | 35.7 | 17.3 | 29.0 | 33.8 | 23.6 | 35.6 | 28.4 | 28.4 | 23.6 | 23.5 | 39.6 | 40.6 | 22.9 | 22.9 | 11.9 |
| Bottoms–950° F.+ | 41.2 | 44.5 | 2.3 | 44.3 | 81.4 | 25.0 | 10.0 | 10.0 | 20.7 | 63.7 | 19.7 | 47.9 | 54.8 | 51.9 | 59.5 | 16.7 | 20.3 | 59.3 | 61.0 | 79.2 |
| Coke | 0.8 | 1.1 | 2.2 | 2.2 | 0.4 | 1.3 | 1.2 | 0.8 | 1.8 | 0.2 | 2.1 | 1.1 | 1.1 | 1.1 | 0.3 | 2.5 | 3.6 | 2.5 | 0.5 | 0.4 |
| | 99.8 | 99.3 | 100.8 | 98.1 | 104.7 | 98.1 | 95.1 | 97.2 | 98.3 | 98.5 | 98.1 | 97.8 | 101.5 | 91.7 | 98.8 | 97.8 | 99.3 | 101.1 | 98.1 | 97.4 |
| Percent Conv.: 100–(Coke+950° F.+) | 58.5 | 54.7 | 95.5 | 53.1 | 22.4 | 73.6 | 96.9 | 88.9 | 77.2 | 35.8 | 77.9 | 50.5 | 45.6 | 54.1 | 40.3 | 80.6 | 76.2 | 39.8 | 37.9 | 19.3 |
| H₂ Consumed s.c.f./bbl | 610 | 730 | 1580 | 1280 | 370 | 1040 | 1530 | 1280 | 1520 | 430 | 1160 | 1220 | 980 | 800 | 310 | 1160 | 800 | 610 | 120 | 250 |

¹ 1875 s.c.f. H₂/bbl. once through, 2500 s.c.f./bbl. recycle.

Various modifications can be made in the procedures of the specific experiments described above to provide other embodiments which fall within the scope of the able solid refractory cracking catalysts are natural or synthetic fluoride-promoted alumina, silica-alumina, silica-magnesia, zirconia-silica, titania-silica, alumina-zirconiasilica, alumina-boria-silica or alumina-magnesia-silica cracking catalysts. The catalytic ingredients can be dispersed on or composited with the base in any conventional manner, for example by impregnating it with a suitable solution of a salt followed by drying and calcining to convert the salt to the oxide.

The process of the present invention requires in the hydrogen step the use of a particular type of feed, namely, one prepared by separating a petroleum residue into two fractions, the first of which is hydrogenated and which has a content of materials insoluble in n-pentane not exceeding about 2 percent by weight. The fraction hydrogenated can be produced by extracting the residue countercurrently in a tower at a top temperature of 200–450° F. and a bottom temperature of 150–400° F. using a $C_4$–$C_6$ paraffin, or mixture of such paraffins, at a solvent to oil ratio of 3:1 to 10:1 by volume. The fraction subjected to hydrogenation can, if desired be produced by extracting an asphaltic residue countercurrently with a solvent mixture composed of 35 percent by volume of n-pentane in admixture with n-butane at a solvent to oil ratio of 7:1 by volume, top tower temperature of about 250° F., bottom tower temperature of about 210° F. and tower pressure of about 400 p.s.i.g. Lower solvent to oil ratios can also be utilized, for example, 5:1.

In the specific experiments the hydrogenation was carried out with the catalyst disposed in a fixed bed. Other methods for contacting the feed, hydrogen and catalyst can also be utilized, for example, the slurry system described in application Serial No. 531,507, filed August 5, 1955, now abandoned, in the names of John W. Teter, William P. Hellinger, Jr. and Calvin J. Bragg, wherein hydrogen, feed and powdered hydrocracking catalyst are fed into the bottom of a reaction vessel and a slurry of catalyst and hydrocracked oil are removed from the top of the reaction vessel. Also, if desired, a plurality of fixed beds of catalyst can be used.

It is claimed:

A method for the hydrocracking of hydrocarbon mixtures which comprises separating from a petroleum asphaltic residue produced as bottoms in the vacuum distillation of petroleum crude oil a fraction comprising about 75 to 95 percent by weight of the material therein soluble in n-pentane and having a content of materials insoluble in n-pentane not exceeding about 2 percent by weight and thereafter subjecting said fraction to hydrocracking conditions of temperature and pressure while in contact with a hydrocracking catalyst.

References Cited in the file of this patent

UNITED STATES PATENTS

| | | |
|---|---|---|
| 2,055,135 | Pier et al. | Sept. 22, 1936 |
| 2,149,900 | Pier et al. | Mar. 7, 1939 |
| 2,697,681 | Murray et al. | Dec. 21, 1954 |
| 2,700,637 | Knox | Jan. 25, 1955 |
| 2,783,188 | Agoston | Feb. 26, 1957 |